United States Patent [19]

Hartman et al.

[11] 3,996,334
[45] Dec. 7, 1976

[54] PROCESS FOR RECOVERING ALUMINUM FROM ALUNITE

[75] Inventors: George J. Hartman, Arvada; Vernon R. Ewing, Denver, both of Colo.

[73] Assignees: Southwire Company, Carrollton, Ga.; National Steel Corporation, Pittsburgh, Pa.; Earth Sciences, Inc., Golden, Colo.

[22] Filed: June 2, 1975

[21] Appl. No.: 582,806

[52] U.S. Cl. .............................. 423/127; 423/112; 423/120; 423/118; 423/131; 423/629; 423/199; 423/181; 423/183

[51] Int. Cl.$^2$ ...................... C01F 7/06; C01D 5/00

[58] Field of Search .......... 423/112, 120, 127, 183, 423/181, 199, 642, 629

[56] References Cited

UNITED STATES PATENTS

| | | | |
|---|---|---|---|
| 2,099,360 | 11/1937 | Yonemura et al. | 423/120 |
| 2,120,840 | 6/1938 | McCullough | 423/120 |
| 2,398,425 | 4/1946 | Haff | 423/120 |
| 3,063,805 | 11/1962 | Gilchrist | 423/642 |
| 3,890,425 | 6/1975 | Stevens et al. | 423/120 |
| 3,890,426 | 6/1975 | Stevens et al. | 423/120 |

OTHER PUBLICATIONS

Nachrod et al., Ed., "Ion Exchange Technology" Academic Press, Inc., N. Y., 1956, pp. 12–14.

*Primary Examiner*—Herbert T. Carter
*Attorney, Agent, or Firm*—Kermith F. Ross; Van C. Wilks; Herbert M. Hanegan

[57] ABSTRACT

An improvement in processes for recovering aluminum from alunite ore which processes include roasting the ore to remove water of hydration, removing sulfur and potassium compounds from the roasted ore by a procedure including a final leaching step resulting in a residue and a solution containing potassium sulfate, effecting partial recovery of potassium sulfate from the solution by crystallization with some potassium sulfate being bled off from the mother liquor, converting aluminum values in the residue to alkali metal aluminates by digesting the residue with alkali metal hydroxide including a substantial amount of sodium hydroxide, removing silicon from the alkali metal aluminates leaving a waste desilication product, recovering aluminum values from the desilicated aluminates by precipitation, circulating the mother liquor from the precipitation step to digestion as contaminated sodium hydroxide is bled off, the improvement which comprises enhancing the economics of the overall process by introducing therein an ion exchange procedure in which potassium hydroxide for the first leaching step is produced through ion exchange by use of potassium sulfate and sodium hydroxide, a further improvement being the use of the desilication product as the ion exchange agent.

9 Claims, 1 Drawing Figure

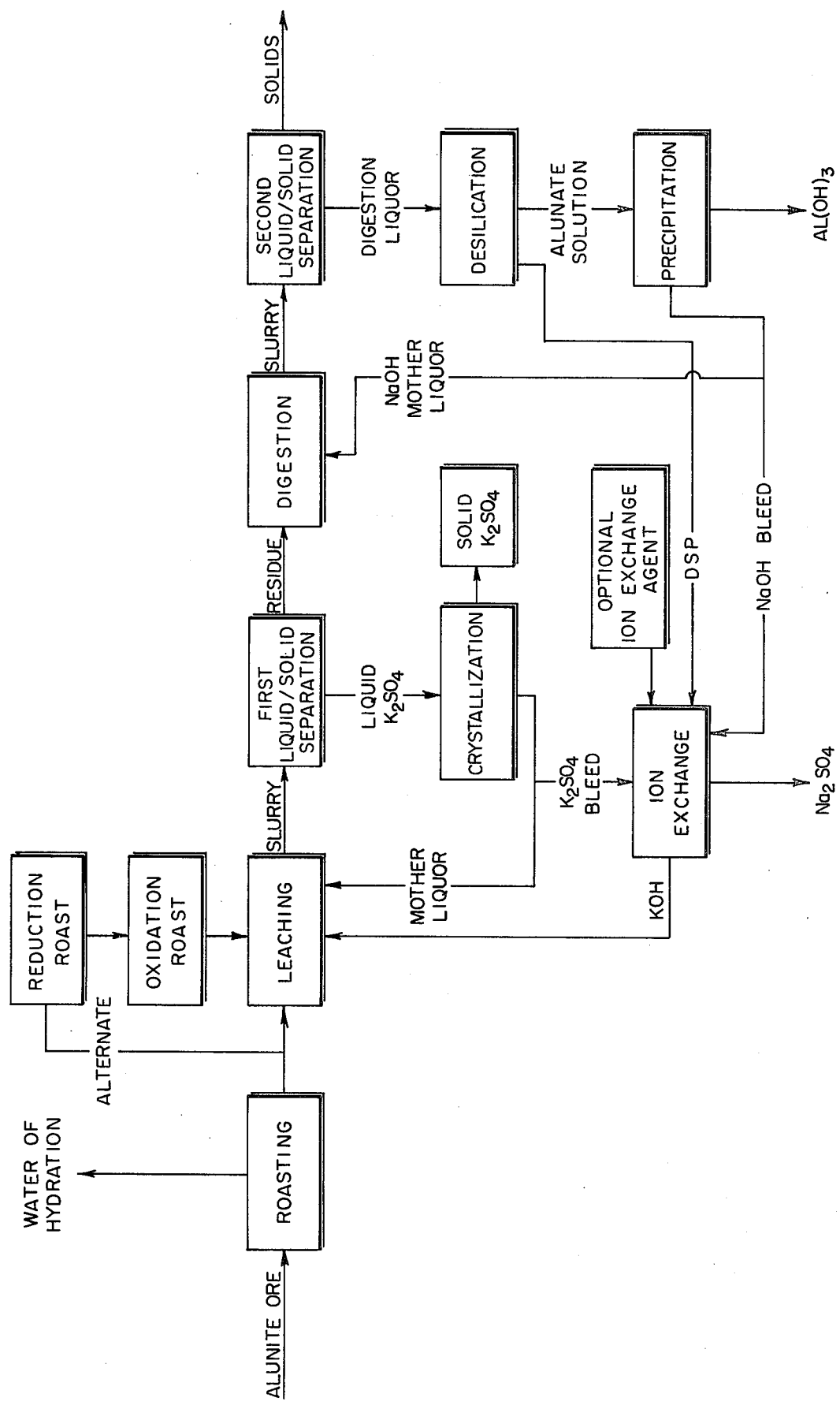

3,996,334

PROCESS FOR RECOVERING ALUMINUM FROM ALUNITE

CROSS-REFERENCES TO RELATED APPLICATIONS

The present invention is an improvement in the basic processes for recovering aluminum from alunite ore disclosed in U.S. patent applications Ser. Nos. 453,225 and 453,234, filed Mar. 21, 1974 now U.S. Pat. Nos. 3,890,426 and 3,890,425, respectively and assigned to a common assignee with this application. The combined processes of these two applications are referred to hereinafter as the basic process.

BACKGROUND OF THE INVENTION

The invention lies in the field of processes for the recovery of aluminum from its ores using crystallization procedures.

The present invention is an improvement in the process disclosed in the above-referenced patent applications, this latter process including the following process steps as illustrated in the flow diagrams of the referenced patent applications.

1. roasting particulate alunite concentrate to remove water of hydration;
2. removing sulfur compounds and alkali metal compounds, including potassium sulfate, from the roasted ore either by the procedure of U.S. Ser. No. 453,234 in which the roasted ore is subjected to a reducing roast and then to an oxidizing roast followed by leaching with a solvent, such as, water or an alkali metal hydroxide, or by the process of U.S. Ser. No. 453,225 in which the roasted ore is leached directly in a solvent, such as, ammonium or alkali metal hydroxide;
3. recovering some of the alkali metal sulfates and/or ammonium sulfate in the leach solution of (2) by crystallization as disclosed in U.S. Ser. No. 453,225 as potassium sulfate liquor which builds up with contaminants in the mother liquor from the crystallization is bled off;
4. digesting the residue from the leaching step with caustic solution to convert aluminum values in the residue to soluble aluminates;
5. precipitating silica from the resulting solution of step (4) to leave a solution of aluminates and a residue known as a desilication product consisting essentially of sodium aluminum silicate along with other impurities;
6. precipitating aluminum values from the solution of step (5);
7. circulating the mother liquor from step (6) to the digestion step while bleeding off contaminated sodium hydroxide; and
8. recovering product aluminum from the aluminum values of step (6).

Both alternatives of step (2) above are included in the expression used herein, "roasting and leaching the ore to remove water and compounds of sulfur and alkali metals.

This invention is an improvement directed to the conversion of waste products from the basic process of the referenced patent applications into usable reagents for the process so that the overall economy of the basic process is enhanced.

The sales price of a commercial grade metal recovered from an ore is dependent upon economic factors related to the process for recovering the metal from its ores. Such factors include amounts of reagents used, processing time, recovery and reuse of by-products rather than discarding them to waste, and other factors. The present invention enhances the economics of the basic process as it results in the recovery of an essential reagent, potassium hydroxide, from two materials ordinarily discarded as waste from the referenced process, i.e., potassium sulfate produced as a by-product in the first leaching step and impurity loaded sodium hydroxide from the digestion step.

The invention also makes possible the use of another conventionally discarded product, i.e., the desilication product from the desilication step, which may be used in this invention as an ion exchange agent for forming potassium hydroxide from waste potassium sulfate and sodium hydroxide.

SUMMARY OF THE INVENTION

The improved process step of this invention, which may be incorporated into the basic process, is the use of a solid ion exchange agent, such as the desilication product or residue from the desilication step, hereinafter sometimes referred to as DSP, for the formation by ion exchange of potassium hydroxide for use in the leaching step from potassium sulfate and contaminated sodium hydroxide. The potassium hydroxide recovered is cycled to the first leaching step of the basic process. By alternately loading and stripping the agent in a procedure which can be made continuous, potassium hydroxide solution for the first leaching step is produced. If a cation exchange agent in the sodium form is used, the agent is first loaded with potassium ions from the potassium sulfate bleed stream. The agent is then stripped with the contaminated sodium hydroxide bleed stream from the digestion step to produce potassium hydroxide which is substantially free of sodium. If an anion exchange agent is used the anion on the agent is first replaced with hydroxyl ion from the contaminated sodium hydroxide. The agent is then stripped with the potassium sulfate to replace hydroxyl ion with sulfate ion to provide potassium hydroxide.

As seen from the flow sheet of the drawing, the source of the potassium sulfate may be the bleed stream from the mother liquor of the potassium sulfate crystallization step in which impurities build up as the mother liquor is recycled to leaching. Likewise, the source of contaminated sodium hydroxide may be the bleed stream from the mother liquor of the aluminum hydroxide precipitation step as the mother liquor is recycled to the digestion step.

The improvement is not limited to the basic process but has application in any process in which potassium sulfate or sodium hydroxide, or both, are produced as by-products and it is particularly applicable to the recovery of aluminum from its ores.

BRIEF DESCRIPTION OF THE DRAWING

The drawing is a flow sheet of the process of the invention showing the basic process of the referenced patent applications modified by the inclusion therein of the improvement process step of the present invention.

DESCRIPTION OF THE PREFERRED EMBODIMENT

The specification and drawings of U.S. patent application Ser. No. 453,225, now U.S. Pat. No. 3,890,426, are incorporated herein by reference and, particularly, the first paragraph of "Summary of the Invention,"

down to the last paragraph, and all of the drawings. The specification and drawings of U.S. patent application Ser. No. 453,234, now U.S. Pat. No. 3,890,425, are incorporated herein by reference, and particularly, the drawings.

In the process of the referenced patent applications, potassium sulfate from the first leaching step may be recovered by crystallization while the mother liquor returns to leaching step. Impurities, such as sodium, eventually build up in the mother liquor to a prohibitive concentration so that some of the mother liquor must be bled off in a bleed stream. This bleed stream is ordinarily discarded and this may create an environmental hazard problem. In the digestion step potassium from the ore not removed in prior steps is picked up in the sodium hydroxide liquor which is sent to desilication and aluminum hydroxide precipitation. The mother liquor from the aluminum precipitation step is recycled to the digestion step. Its potassium content gradually builds up from the digestion step so that some of the mother liquor must be bled off to prevent potassium contamination of the aluminum product. This bleed stream of contaminated sodium hydroxide is ordinarily discarded, this also creating an environmental hazard problem.

Following the flow diagram of the drawing illustrating the present invention, it will be seen that the potassium sulfate bleed stream from the sulfate crystallization step and contaminated sodium hydroxide from the aluminum digestion step are sent to ion exchange where potassium hydroxide is regenerated and recycled to the first leaching step.

It has been found that the desilication product (DSP) from the desilication step can be used as a cation exchange agent in the process; however, the invention is not limited to the use of this agent, as conventional ion exchange agents may also be used. When it is used as the ion exchange agent the economy of the process is further improved.

Desilication of the aluminate solution from the digestion step of the basic process may be accomplished by precipitating the silica either by heating or seed crystallization as sodium aluminum silicate which, along with impurities, constitutes the desilication product. When the desilication product is used as a cation exchange agent in an ion exchange column, flowing potassium sulfate bleed stream through the column results in the exchange of potassium ions with the sulfate for sodium ions with the silicate. Subsequent passage of waste sodium hydroxide through the potassium loaded DSP agent results in regeneration of the agent with sodium ions and the formation of potassium hydroxide substantially free of sodium for use in the first leaching step. The sodium sulfate formed is discarded.

An analogous phenomenon occurs, of course, when commercial solid cation exchange agents are used.

In the case of solid anion exchange agents used in an ion exchange column, the agent is loaded with hydroxyl anion by flowing contaminated sodium hydroxide bleed stream through the column to exchange hydroxyl ion for anion on the agent. Flowing potassium sulfate bleed stream through the agent loaded with hydroxyl ions results in regeneration of the agent by exchange of sulfate ions with the sulfate for hydroxyl ions on the agent with the formation of substantially sodium-free potassium hydroxide which is recycled to the first leaching step.

The leaching agent for leaching the roasted ore may be ammonium hydroxide or an alkali metal hydroxide. The digestion agent for solubilizing aluminum values in the residue may be an alkali metal hydroxide or a mixture of these; however, sodium hydroxide is the preferred agent.

The operation of the invention is illustrated by the following examples which are not limiting of the invention.

EXAMPLE I

In this example, a desilication product having an analysis of the following components in weight per cent was used:

| | |
|---|---|
| Sodium | 15–20% |
| $Al_2O_3$ | 30–35% |
| $SiO_2$ | 30–35% |

The solid DSP agent in an ion exchange column was loaded with potassium ions by flowing potassium sulfate through the column with the formation of sodium sulfate followed by stripping the agent with sodium hydroxide to exchange sodium ions for potassium ions on the agent and form potassium hydroxide.

The DSP used was first dried at 100° C for 24 hours although this heating step is not critical. A wet volume of 48 mils of the DSP having an average particle size of about +−100 mesh U.S. sieve was used in a vertical column which was about 1 inch in diameter and 4 feet in length. The potassium sulfate solution used, which was contaminated with about 0.02 gpl of sodium, analyzed 45 gpl of potassium sulfate and the sodium hydroxide solution used, which was contaminated with about 0.02 gpl of potassium, analyzed 21.7 gpl of sodium. A flow rate of about 0.3–0.4 mls/min for both the potassium sulfate and the sodium hydroxide was used. Consecutive 10 ml samples of the effluent were taken and analyzed for sodium and potassium. Results of the test are set forth in the following Table I.

TABLE I

| $K_2SO_4$ addition (Load K$^+$) | | | |
|---|---|---|---|
| Sample | gpl K | gpl Na | Vol. |
| 1 | & 0.01 | & 0.21 | 10 ml |
| 2 | 0.02 | 0.24 | '' |
| 3 | 0.39 | 2.24 | '' |
| 4 | 5.4 | 8.0 | '' |
| 5 | 15.4 | 10.0 | '' |
| 6 | 22.0 | 9.3 | '' |
| 7 | 29.3 | 7.2 | '' |

| (K$^+$ strip with NaOH) | | | |
|---|---|---|---|
| Sample | gpl K | gpl Na | Vol. |
| 1 | & 0.63 | & 2.71 | 10 ml |
| 2 | 0.42 | 0.13 | '' |
| 3 | 0.42 | 0.14 | '' |
| 4 | 1.80 | 0.62 | '' |
| 5 | 9.0 | 3.0 | '' |
| 6 | 11.0 | 5.0 | '' |
| 7 | 20.0 | 5.70 | '' |

The results show that substantially good potassium loading rates were achieved rather rapidly, i.e., by the time the fourth or fifth sample was taken, as significant amounts of potassium do not appear in the effluent until then.

In the stripping operation it is noted that as large percentages of potassium are recovered only small percentages of sodium are picked up. The results show that the agent holds the sodium well as potassium is being replaced to form substantially sodium-free potassium hydroxide up to a point. The percentage recovery of the potassium as potassium hydroxide from the solutions through the agent of about 0.3–0.5 ml/min. was used. Consecutive 10 ml samples of the effluent were taken and analyzed for sodium and potassium. Results of the tests are set forth in the following Table II.

TABLE II

K₂SO₄ addition (column is being loaded with K⁺ ions)

| Sample | Gpl Na in effluent | Gpl K in effluent | Vol. |
|---|---|---|---|
| 1 | & 5.8 | & 0.5 | 10 ml. |
| 2 | 18.5 | 1.4 | " |
| 3 | 20.0 | 1.1 | " |
| 4 | 18.8 | 0.93 | " |
| 5 | 20.3 | 0.78 | " |
| 6 | 22.5 | 0.69 | " |
| 7 | 23.0 | 0.60 | " |
| 8 | 23.5 | 0.41 | " |
| 9 | 24.6 | 0.45 | " |
| 10 | 22.5 | 5.0 | " |
| 11 | 18.5 | 11.0 | " |
| 12 | 16.3 | 15.8 | " |
| 13 | 14.5 | 20.0 | " |
| 14 | 11.8 | 22.6 | " |
| 15 | 8.4 | 30.5 | " |
| 16 | 8.4 | 30.4 | " |
| 17 | 5.8 | 34.6 | " |
| 18 | 3.05 | 40.0 | " |
| 19 | 1.06 | 44.7 | " |
| 20 K₂SO₄ wash | — | 6.0 | " |

NaOH addition (column is being loaded with Na⁺ ions)

| Sample | Vol. | Gpl Na (in effluent) | Gpl K (in effluent) | Gpl NaOH Based On Na Content | Gpl KOH Based On K Content |
|---|---|---|---|---|---|
| & 1 | 10 ml | & 0.03 | & 0.5 | & 0.5 | & 0.7 |
| 2 | " | 0.024 | 0.024 | 0.04 | 0.03 |
| 3 | " | 0.07 | 21.5 | 0.12 | 30.87 |
| 4 | " | 0.06 | 25.5 | 0.10 | 36.59 |
| 5 | " | 0.09 | 31.7 | 0.16 | 45.49 |
| 6 | " | 0.04 | 23.5 | 0.07 | 33.72 |
| 7 | " | 0.03 | 31.7 | 0.05 | 45.48 |
| 8 | " | 0.03 | 30.8 | 0.05 | 44.20 |
| 9 | " | 0.02 | 30.8 | 0.03 | 44.20 |
| 10 | " | 0.04 | 31.7 | 0.07 | 45.49 |
| 11 | " | 0.12 | 29.0 | 0.21 | 41.61 |
| 12 | " | 0.04 | 30.8 | 0.07 | 44.19 |
| 13 | " | 1.05 | 29.0 | 1.83 | 41.61 |
| 14 | " | 2.17 | 28.0 | 3.77 | 40.18 |
| 15 | " | 3.50 | 24.6 | 6.09 | 35.30 |
| 16 | " | 4.72 | 20.0 | 8.21 | 28.7 |
| 17 | " | 6.20 | 18.0 | 10.78 | 25.83 |
| 18 | " | 7.60 | 15.2 | 13.22 | 21.8 |
| 19 | " | 8.70 | 13.7 | 15.13 | 19.66 |
| 20 | " | 10.5 | 17.5 | 18.26 | 25.11 |
| 21 | " | 11.2 | 10.0 | 19.48 | 14.35 |
| 22 | " | 13.0 | 7.5 | 22.61 | 10.76 |
| 23 | " | 14.8 | 6.0 | 25.74 | 8.61 |
| 24 | " | 14.8 | 4.39 | 25.74 | 6.30 | waste potassium sulfate is reasonably good while the regeneration of the agent with waste sodium hydroxide was satisfactory.

EXAMPLE II

The commercial solid cation exchange agent used was a strongly acidic sulfonated polystyrene resin with divinyl benzene cross linkage of about 10%, the functional group being a sulfonic group. It is sold commercially by many chemical supply agencies, for example, under the tradename of "Baker C-249."

A wet volume of 48 mls of the solid resin were used in a vertical column one inch in diameter and four feet in length. It had a particle mesh size of 15–50 U.S. sieve. The potassium sulfate used had a concentration of 50 gpl of potassium sulfate and a concentration of about 0.02 gpl of sodium. The sodium hydroxide solution used had a concentration of 26.9 gpl and a concentration of about 0.02 gpl of potassium. A flow rate of The potassium loading results show that a rather rapid potassium loading rate is achieved immediately and that maximum loading rate is achieved by about the time the ninth and tenth samples are taken, as substantial percentages of potassium appear in the effluent after that point. This is further verified by the fact that major percentages of displaced sodium appear in the effluent at and slightly before this point.

The stripping results show that fairly rapid stripping of potassium is achieved with substantially good stripping rates obtained until the agent is about depleted of potassium. These results conform with the sodium loading results.

What is particularly significant about the results is that minimum amounts of sodium occur in the effluent until a substantial period after the agent is first contacted with sodium hydroxide. This is important in that it indicates that the ion exchange procedure can be regulated to provide suitable potassium hydroxide for recycle to the first leaching step.

EXAMPLE III

In this example a solid anion exchange agent was used which is sold under the tradename of "DOW SAR" by the Dow Chemical Company of Midland, Mich. Its functional group is an alkanol quaternary amine in a styrene divinylbenzene copolymer matrix having about 8% cross-linkage, the amine group having the formula:

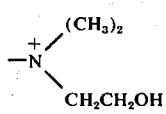

A vertical column 1 inch in diameter and 48 inches long was used. It was loaded with 68 mls of the solid anion exchange resin in the wet form. The composition of the potassium sulfate and sodium hydroxide solutions used was about the same as that used in the other examples. A flow rate through the column of about 0.3–0.4 ml/min was used. The total volume of liquid was 200 mls. The sodium hydroxide solution, was first flowed through the resin to load it with hydroxyl ion. The hydroxyl ion loaded resin was then stripped with potassium sulfate solution to replace the hydroxyl ion on the agent with sulfate ion to form potassium hydroxide which was substantially sodium-free. A sample of effluent analyzed 25.3 gpl of potassium hydroxide and 0.05 gpl of sodium indicating that a significant yield of potassium hydroxide can be obtained from the waste potassium sulfate which is substantially sodium-free.

The invention is not limited to the particular ion exchange agents used in the examples to illustrate its operation. Other agents may be used, such as, strongly basic Type II anion agents and strongly acid Type II cation agents.

The ion exchange process described is peculiarly adapted to the recovery of potassium hydroxide from formerly waste products because neither the contamination of potassium sulfate with sodium ions nor the contamination of sodium hydroxide with potassium ions substantially affects the chemistry involved, so that no purification of the waste products is necessary prior to ion exchange. The process can be tied into the overall process and made continuous with alternate loading and stripping of the agent.

Of course, the ion exchange procedure can be regulated by known techniques as to flow rates, potassium and sodium content of the recovered effluent, and other process parameters as required for commercial application. The concentration of recovered potassium hydroxide effluent can be adjusted as required for the leaching step of the basic process.

While the invention is intended for use of sodium hydroxide bleed solution from the basic process, it is not limited to this source for the sodium hydroxide as it can come from other sources. Likewise, the waste sodium hydroxide can be used in the described ion exchange process with potassium sulfate from other sources than the bleed stream from the sulfate crystallization step of the basic process.

Obviously, the invention is not limited to the basic process as it can be used in any process in which potassium sulfate or sodium hydroxide, or both, are produced as by-products.

It is seen from the above description that improvements to the basic process are provided by this invention in which DSP can be profitably used and potassium hydroxide, a necessary reagent for the first leaching step of the basic process, is produced from the by-products, potassium sulfate and sodium hydroxide, the improvements contributing significantly to the economy of the basic process for producing aluminum from alunite ore.

What is claimed is:
1. A process for recovering aluminum hydroxide from alunite ore comprising the following steps:
   a. roasting the ore to remove water and leaching the roasted ore with an alkaline solvent or water to remove compounds of sulfur and alkali metals including potassium sulfate resulting in a residue containing aluminum values and a solution containing potassium sulfate;
   b. separating the residue and solution of step (a);
   c. recovering potassium sulfate from the solution of (b) by crystallization while bleeding off a portion of potassium sulfate from the mother liquor;
   d. contacting an anion exchange agent loaded with hydroxyl ions with the potassium sulfate bleed stream to replace said hydroxyl ion with sulfate to form potassium hydroxide and cycling said potassium hydroxide to the leaching of step (a);
   e. digesting the residue from step (b) with at least one alkali metal hydroxide at a concentration and at a temperature sufficient to dissolve substantially all of the aluminum values from said solid portion as aluminates;
   f. separating the liquid and solid portions of the slurry resulting from step (e);
   g. removing silica from the liquid portion resulting from step (f) by precipitation as a desilication product which is essentially sodium aluminum silicate;
   h. separating the liquid and solid portions resulting from step (g), and
   i. precipitating and recovering aluminum hydroxide from the aluminates in the liquid portion resulting from step (h).

2. The process of claim 1 in which said residue from step (b) is digested with sodium hydroxide and including cycling the liquid portion of step (i) to the digestion step (e) while removing a bleed stream therefrom containing sodium hydroxide and using it to regenerate said anion exchange agent.

3. The process of claim 1 in which in step (a) after the ore is roasted to remove water the residue is subjected to a reduction step followed by an oxidation step prior to leaching.

4. The process of claim 1 in which in step (a) after the ore is roasted to remove water the residue is subjected directly to leaching.

5. A process for recovering aluminum hydroxide from alunite ore comprising the following steps:
   a. roasting the ore to remove water and leaching the roasted ore with an alkaline solvent or water to remove compounds of sulfur and alkali metals including potassium sulfate resulting in a residue containing aluminum values and a solution containing potassium sulfate;
   b. separating the residue and solution of step (a);
   c. recovering potassium sulfate from the solution of (b) by crystallization while bleeding off a portion of potassium sulfate from the mother liquor;

d. contacting the potassium sulfate bleed stream with a cation exchange agent loaded with sodium ions to exchange potassium ions for sodium ions on the agent followed by contacting the potassium loaded agent with sodium hydroxide to exchange sodium ions for potassium ions on the agent to form potassium hydroxide and recycling said potassium hydroxide to the leaching of step (a);

e. digesting the residue from step (b) with at least one alkali metal hydroxide at a concentration and at a temperature sufficient to dissolve substantially all of the aluminum values from said solid portion as aluminates;

f. separating the liquid and solid portions of the slurry resulting from step (e);

g. removing silica from the liquid portion resulting from step (f) by precipitation as a desilication product which is essentially sodium aluminum silicate;

h. separating the liquid and solid portions resulting from step (g), and i. precipitating and recovering aluminum hydroxide from the aluminates in the liquid portion resulting from step (h).

6. The process of claim 5 in which said residue from step (b) is digested with sodium hydroxide and including cycling the liquid portion of step (i) to the digestion step (e) while removing a bleed stream therefrom containing sodium hydroxide and using said sodium hydroxide for contacting the potassium loaded agent of step (d) to exchange sodium ions for potassium ions on the agent.

7. The process of claim 5 in which the desilication product of step (g) is used as the cation exchange agent of step (d).

8. The process of claim 5 in which in step (a) after the ore is roasted to remove water the residue is subjected to a reduction step followed by an oxidation step prior to alkaline leaching.

9. The process of claim 5 in which in step (a) after the ore is roasted to remove water the residue is subjected directly to alkaline leaching.

* * * * *